United States Patent [19]

Morais

[11] Patent Number: 4,528,656
[45] Date of Patent: Jul. 9, 1985

[54] RADIO COMMUNICATION SYSTEM USING FREQUENCY DIVISION MULTIPLEXING FOR TRANSMISSION BETWEEN A MASTER STATION AND A PLURALITY OF REMOTE STATIONS

[75] Inventor: Douglas H. Morais, Dollard des Ormeaux, Canada

[73] Assignee: Harris Corporation, Melbourne, Fla.

[21] Appl. No.: 394,764

[22] Filed: Jul. 2, 1982

[51] Int. Cl.³ .......................... H04L 5/14; H04J 1/00; H04B 7/00
[52] U.S. Cl. .................................... 370/30; 370/69.1; 455/34; 340/825.73; 179/2 EB
[58] Field of Search ................... 370/69.1, 30; 455/31, 455/34, 35, 36, 53, 54; 340/825.47, 825.48, 825.74, 825.73, 825.76; 179/2 EB

[56] References Cited

U.S. PATENT DOCUMENTS

| | | | |
|---|---|---|---|
| 3,368,201 | 2/1968 | Skrobisch | 340/825.74 |
| 3,495,177 | 2/1970 | Brooks | 340/69.1 |
| 3,581,208 | 5/1971 | Buehrle, Jr. | 340/825.74 |
| 3,670,242 | 6/1972 | McGarrey | 340/825.48 |
| 4,117,267 | 9/1978 | Haberle et al. | 370/69.1 |
| 4,129,349 | 12/1978 | Goldman | 179/2 EB |

Primary Examiner—Douglas W. Olms
Assistant Examiner—Frank M. Scutch, III
Attorney, Agent, or Firm—Antonelli, Terry & Wands

[57] ABSTRACT

A point-to-multipoint radio communication system includes a master station and a plurality of remote stations which communicate with the master station using frequency division multiplexing. Each remote station transmits on a separate frequency, but the respective frequencies of transmission by the remote stations are closely spaced so as to be contained within the band which is centered on a single licensed frequency. Thus, the system may operate with only a first licensed frequency for communication from the master station to the remote stations and a second licensed frequency for communications from the remote stations to the master station.

6 Claims, 4 Drawing Figures

RADIO COMMUNICATION SYSTEM USING FREQUENCY DIVISION MULTIPLEXING FOR TRANSMISSION BETWEEN A MASTER STATION AND A PLURALITY OF REMOTE STATIONS

FIELD OF THE INVENTION

The present invention relates in general to communication systems, and more particularly, to a point-to-multipoint radio communication system for effecting communication between a master station and a plurality of remote stations at assigned frequencies.

BACKGROUND OF THE INVENTION

It has been recognized that in systems which operate to effect radio communications between a master station and a plurality of remote stations, it may be impractical to allocate a different assigned frequency to each remote station in addition to the frequency normally assigned to the master station. In this regard, there are only a limited number of frequencies which have been allocated for this type of communication, so that difficulties exist in obtaining a license to operate exclusively over a large number of these assigned frequencies, as would be required if each remote station of a relatively-large system required a separate licensed transmission frequency.

This problem is directly addressed in the Goldman U.S. Pat. No. 4,129,749, which discloses a system in which a single first frequency is assigned for transmission between the master station and all remote stations, and a second single frequency is assigned for transmission from all remote stations to the master station. To effect message separation and ensure integrity in the various transmissions to the master station, each of the first and second frequencies is divided into a number of communication channels by time division multiplexing, with guard channels being provided between each of these communication channels. Unfortunately, this type of system has the disadvantage that circuitry must be provided at the master station and all remote stations for inserting synchronizing signals into the transmission and for detecting these synchronizing signals so that proper demultiplexing of the various communications can be effected. In addition, time division multiplexing provides inherently poor spectral efficiency, and therefore, for a given allocated transmission bandwidth, imposes a limit on the number of channels which may be utilized for communication in the system that is lower than that achievable with frequency multiplexing.

A system for effecting duplex communication between a master station and a plurality of remote stations is also disclosed in German Offenlegungsschrift No. 2738624, assigned to Thompson-CSF, in which frequency division multiplexing techniques are used to maintain channel separation. In this prior art system, the IF frequencies at both the master and the slave stations are constrained to be the difference between the transmit and receive frequencies. As a result, each remote station requires the use of a frequency lock loop to maintain this relationship. In addition, a different IF frequency is required at each remote station, and these IF frequencies are fixed by the selected transmit and receive frequencies. Thus, although this prior art system utilizing frequency division multiplexing solves some of the basic inherent disadvantages in the use of time division multiplexing, the use of interrelated transmit and receive frequencies for transmission between the master station and the remote stations limits the flexibility of frequency assignment within the system. In addition, this related frequency approach produces limitations in the design of the master station in that the intermediate frequency of each received signal is constrained to correspond to the difference between the assigned frequency and the received frequency of each respective remote station with the result that the transmit-receive frequency spacing is limited. Similarly, at the remote stations, the receive frequency is the same for all remote stations, but the transmit frequency varies, so that the intermediate frequency must be different for each remote station, which places undesirable design restraints on the system.

It is therefore an object of the present invention to provide a communication system of the type described which avoids disadvantages of the prior art.

It is also an object of the present invention to provide a communication system of the type described which makes it possible to reduce the costs and the administrative burdens required in obtaining the appropriate licenses for the transmission frequencies used by the system.

It is another object of the present invention to provide a communication system including a master station and a plurality of remote stations in which communications are effected using frequency division multiplexing techniques in a simplified manner, and in which a first frequency is assigned for transmission from the master station to all of the remote stations and a different unrelated second frequency is assigned for communication from all of the remote stations to the master station.

It is still another object of the present invention to provide a communication system of the type described in which each transmission channel between a remote station and the master station may comprise a plurality of sub-channels, thereby greatly improving the spectral efficiency of the system.

BRIEF DESCRIPTION OF THE INVENTION

In accordance with the present invention, a system is provided which includes a master station and a plurality of remote stations which are capable of communicating with the master station by point-to-multipoint radio transmission. In the master station, information to be transmitted, be it voice or data, is frequency division multiplexed to form a baseband signal, and this signal frequency (or phase) modulates a single carrier to create the transmitted signal at a first licensed frequency $f_t$, which is radiated from a master antenna to all of the remote stations. The remote receiver demodulates the entire baseband, then demultiplexes the information intended only for that remote station.

In the transmission from a remote station to the master station, information to be transmitted is frequency division multiplexed to form a baseband signal which then frequency modulates a single carrier at a frequency $f_r$ which is different from the frequency $f_t$ used to transmit from the master station to the remote station. In a system which consists of n remote stations, then n such modulated carrier signals will be transmitted in the direction of the master station. Each remote station transmits on a separate frequency, but the n frequencies are closely spaced so as to be contained within the band which is centered on the second licensed frequency $f_r$. At the master station, the n received signals are downconverted to the intermediate frequency range by a common downconverter, and each modulated signal is then passed through a highly-selective bandpass filter which passes that signal originating from a particular remote station and rejects all others. The filtered signal is then demodulated and demultiplexed if necessary.

The system in accordance with the present invention, therefore, requires the allocation of one frequency pair only, i.e., the frequency $f_t$ which forms the basic carrier for all of the signals transmitted from the master station and the frequency $f_r$ transmitted from each of the remote stations. In this way, a reduced number of licensed frequencies is required by the system, while also providing a large number of channels within the bandwidth allocated by the two frequencies to support a large number of remote stations. In addition, the internal circuitry required at the master station and the remote stations for downconverting and detecting imposes less restraints from the point of view of frequency control and the spacing of the intermediate frequencies assigned to the respective remote stations, as compared to the prior art.

A further feature of the present invention relates to the fact that each remote station can be assigned the same unique intermediate frequency, and is capable of accommodating multiple voice and/or data signals in its transmission with the master station. This multiple signal feature further increases the transmission efficiency of the system without the need for an increased number of licensed frequencies.

These and other objects, features and advantages of the present invention will become more apparent from the following detailed description, when taken in conjunction with the accompanying drawings, relating to a preferred embodiment.

DETAILED DESCRIPTION OF A PREFERRED EMBODIMENT

Figure 1:
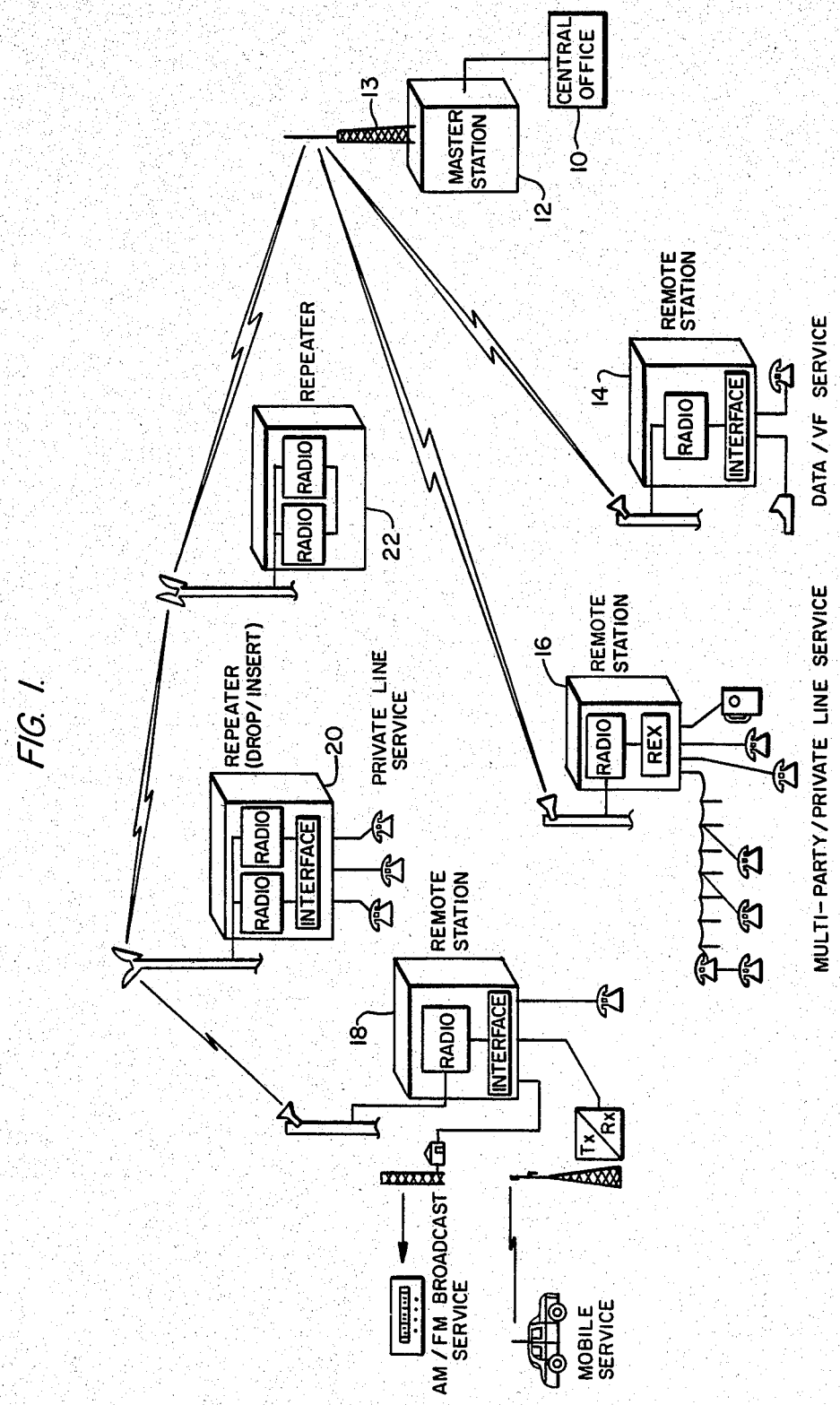
FIG. 1 is a schematic diagram of the overall system configuration of the present invention.

The present invention provides a multi-point distribution system in which up to ten remote links may be served from a single master station, each link being capable of carrying six or twelve different voice and/or data signals in its transmission. FIG. 1 illustrates an exemplary embodiment of such a system in which only five remote stations 14–22 are shown in communication with the master station 12 for simplification of description. Each remote station 14–22 is capable of handling up to six or twelve (4 KHz) voice frequency (VF) channels or, alternatively, wideband channels up to 24 or 48 KHz for a variety of applications including data transmission at rates of up to 56 kb/s. Accordingly, a system having ten remote stations with each remote station equipped for six VF and/or data channels will have an overall equivalent VF channel capacity of 60 channels. On the other hand, if each remote station is equipped for twelve VF channels, then the overall system equivalent VF channel capacity is 120 channels. Thus, the system can be planned with a mixture of six and twelve VF channel and wideband data remote stations, as needs require.

The system of the present invention is capable of operating in many frequency bands and can be used for a wide variety of services based on the different types of remote stations selected. As seen in FIG. 1, a remote station 14 provides a data link which is capable of conveying wideband data plus voice frequency communications to provide for interconnect or extension of high speed data channels for remote computer terminals, real-time telecontrol systems and the like. The remote station 16 is an example of a rural electronic exchange (REX) service link to accommodate service for remote-telephone classes of service, such as single-party or multi-party subscribers, pre-pay and semi-post-pay stations and off-premises extensions utilizing a two-wire line configuration within a nominal 4 KHz wide voice frequency channel. This remote station 16 also allows a subscriber to call others within the system without the need for a trunk circuit and is in essence a concentrator providing for up to 104 lines into a maximum of twelve trunks combined with a local switch to offer most of the features and functions of a modern electronic exchange including toll message detail recording or automatic number identification.

The remote station 18 typically provides a wideband audio link for carrying broadcast program channels, by the addition of appropriate program multiplex equipment. The 24 KHz baseband spectrum is used for a single 10 or 15 KHz mono-program, while the 48 KHz baseband spectrum is capable of accommodating one high quality stereo or two mono-programs. In both applications, sufficient baseband is available for cue channels, transmitter telecontrol or other voice grade applications.

The remote station 20 operates as a repeater coupled with private line service, while the remote station 22 exemplifies a simple repeater.

In its operation, the master station 12 transmits on a common RF frequency $f_t$ to all remote stations with either a 60 or 120 voice frequency channel baseband spectrum via an omnidirectional antenna 13 using analog FM/FDM transmission techniques whereby all channels are available all the time, unlike demand-assign systems. A communication relevant to a particular remote station is then extracted from the total baseband spectrum appearing at the remote station using FDM techniques.

The master station 12 receives a maximum of ten closely-spaced RF carriers within a single RF channel allocation bandwidth from the individual remote stations. A common receiver within the master station 12 then downconverts the received signal to the intermediate frequency level, and each intermediate frequency is then processed by separate IF demodulators which provide individual baseband outputs from each remote station. These baseband outputs occupy a common baseband spectrum as determined by the channel capacity selected, i.e., six or twelve channels.

Figure 2:
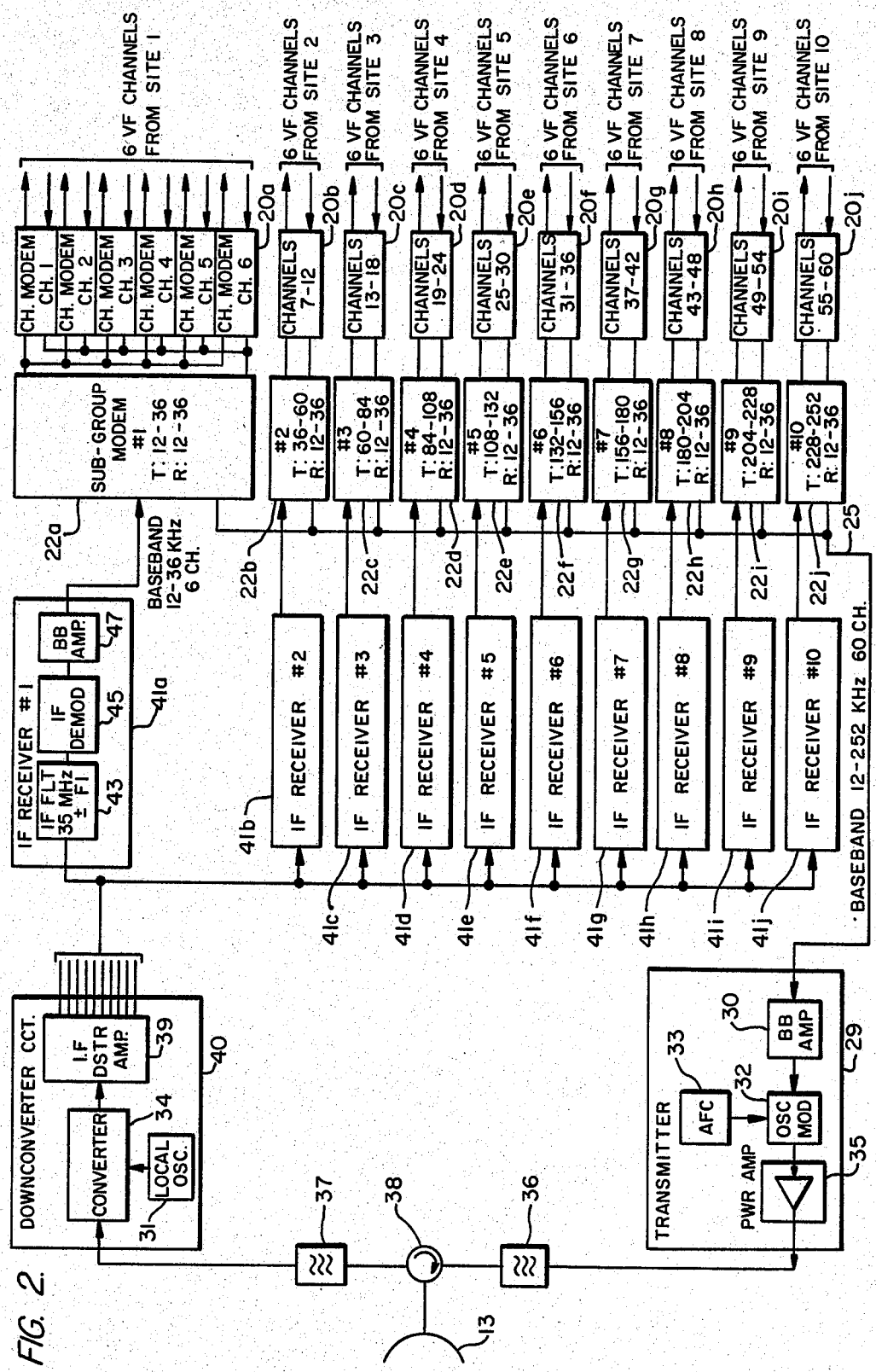
FIG. 2 is a schematic block diagram of the master station.

FIG. 2 is a more detailed diagram of the master station in a system including ten remote stations, each remote station communicating with the master station on a separate channel which conveys six VF channels. Thus, the master station includes ten modems 20a–20j, each being comprised of six VF channel modems as typically shown by the modem 20a. Associated with each of the modems 20a–20j is a corresponding sub-group modem 22a-22j, which operates to downconvert the segment of the incoming baseband containing the desired sub-group of six VF channels to a frequency range compatible with the inputs to the six VF channel modems and, in the outgoing direction, to upconvert the combined outputs of the six VF channel modems to a frequency range such that it can be multiplexed with the outputs of the other sub-group modems onto the common line 25 and fed to the transmitter 29.

The transmitter 29 includes a baseband amplifier 30 which amplifies the outgoing baseband signal and applies it to the oscillator modulator 32, which operates to modulate the baseband signal onto the licensed transmission frequency $f_t$. This modulated carrier output signal may be applied through a power amplifier 35 and a filter 36 to a circulator 38 connected to the omnidirectional antenna 13.

Incoming signals received by the antenna 13 are applied through the circulator 38 and a filter 37 to the receiver 40 in the master station. This receiver 40 includes a downconverter 34 to which is connected a local oscillator 31, which produces a signal such that the downconverter output is centered about a desired IF frequency. This intermediate frequency output is set at the second licensed frequency $f_r$. The output of the downconverter 34, which represents the ten nominal frequency signals transmitted by the respective remote stations, is applied to an IF distribution amplifier 39 which applies these outputs on separate lines to each of the receiver demodulators 41a-41j. The receiver demodulator 41a is typical and includes an intermediate frequency filter 43 which passes the particular IF band relating to a corresponding one of the remote stations, the output of this filter 43 being converted to baseband by the intermediate frequency demodulator 45, the output of which is applied through the baseband amplifier 47 to a respective one of the sub-group modems 22a-22j.

Figure 3:
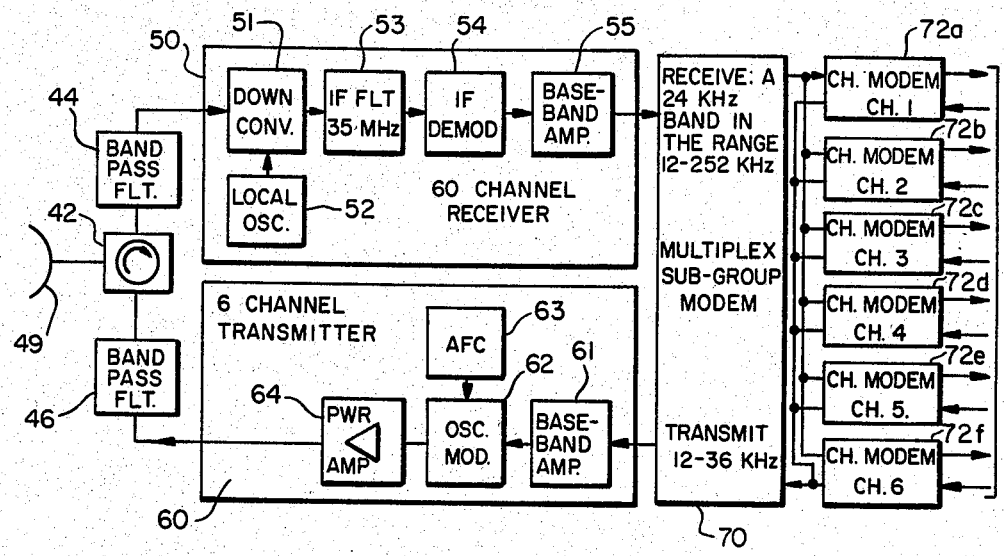
FIG. 3 is a basic block diagram of a typical remote station.

FIG. 3 illustrates the details of a typical remote unit, including six sub-channel modems 72a-72f connected to a multiplexer 70, which serves to distribute the baseband signal from the receiver 50 to the respective sub-channel modems and to combine the baseband outputs from the six modems onto a single line to the transmitter 60. The transmitter 60 includes a baseband amplifier 61 whose output is connected to the oscillator modulator 62 controlled by an automatic frequency control circuit 63 to modulate the six sub-channels onto the carrier of the oscillator modulator 62 for transmission. The modulated carrier may be applied through a power amplifier 64 to a bandpass filter 46 which passes the modulated signal through a circulator 42 to the transmission antenna 49.

The transmission from the master station which is received at the antenna 49 is applied through the circulator 42 and a bandpass filter 44 to the sixty channel receiver 50. This incoming signal is applied to a downconverter 51 to which a local oscillator 52 is connected, the local oscillator 52 producing a signal at a frequency such that the downconverter output is at the desired IF frequency. The output of the downconverter 51 is applied through an intermediate frequency filter 53, which serves to eliminate high frequency disturbances, to an IF demodulator circuit 54 which operates to demodulate the entire baseband signals applied at the master station. The output of the demodulator 54 is applied through a baseband amplifier 55 to the sub-group modem 70 and channel modems 72a-72f, which operate to demultiplex only those signals intended for the particular remote station.

The operation of a typical system involving two-way transmission and reception between the master station in FIG. 2 and a typical remote station in FIG. 3 will now be described. The sixty voice frequency sub-channels received from the central office 10 at the master station 12 are applied to the modems 20a-20j in the master station, as seen in FIG. 2. In this regard, there is a 4 KHz spacing between the outputs of the individual channel modems that form a sub-group, with the composite output of these modems having a bandwidth of 24 KHz, located between 12 and 36 KHz. The sub-group modems 22a-22j combine the outputs of the modems 20a-20j onto the common line 25 to the transmitter 29 where the baseband signal is modulated onto the carrier at the first licensed frequency $f_t$ by the oscillator modulator 32. The modulated carrier is then transmitted via the omnidirectional antenna 13 after possible amplification and filtering.

In FIG. 3, the modulated carrier transmitted from the master station 12 is received at the antenna 49 of the remote station and applied to the receiver 50 where it is downconverted to the design IF frequency of 35 MHz by being mixed with the output of the local oscillator 52. The filter 53 is centered at 35 MHz and operates to eliminate undesirable high-frequency components, after which the demodulator 54 demodulates the multiplexed sixty voice channels transmitted from the master station. The demodulator output is amplified in the baseband amplifier 55 and applied to the sub-group modem 70 which locates the desired signals in the 12-36 KHz range and distributes them to the individual channel modems 72a-72f for conversion to voice frequency.

Figure 4:
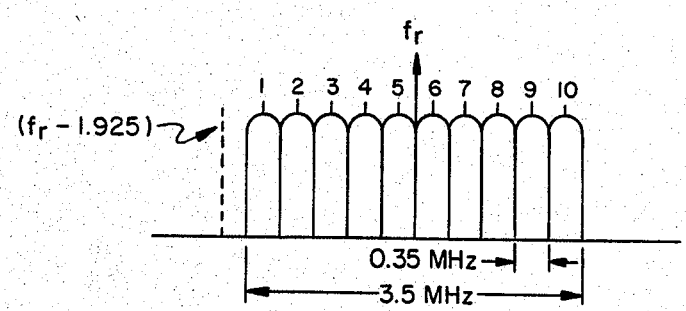
FIG. 4 is a schematic diagram showing the spectrum of IF frequencies centered about the frequency $f_r$, which is received at the master station from the various remote stations.

In the transmission from remote station to master station, the six VF channels applied to the channel modems 72a-72f in the remote station are converted to a baseband of 12-36 KHz, providing a 4 KHz channel spacing. This baseband signal is applied through the sub-group modem 70 to the transmitter 60 where it is modulated on the carrier produced by the oscillator modulator 62. In this regard, each remote station transmits on a separate frequency, but the ten frequencies of the ten remote stations are closely-spaced so as to be contained within the channel permitted for the return transmission to the master station, this channel being centered on the licensed frequency $f_r$. Thus, as seen in FIG. 4, with each remote station being assigned a channel at a spacing of 0.35 MHz, about a center frequency $f_r$, a transmission bandwidth of 3.5 MHz is required, which falls within the channel allocation for the licensed frequency. Thus, as apparent from FIG. 4, the frequency $F_c$ of the oscillator modulator 62 in a particular remote station will be equal to $f_r - BW(N+1)/2N + n/N$ or in the case of the example; $(f_r - 1.925) + 0.35 n$, being the position of the channel for that remote station in the transmission band relative to the other channels in the band, in the order of ascending frequency, N being the number of remote stations and BW being the authorized bandwidth of the channel centered on $f_r$.

The antenna 13 at the master station will receive the ten channels transmitted from the ten remote stations and apply this communication to the downconverter 34 which receives the output at a frequency $f_r$ from local oscillator 31. Thus, the output from the downconverter 34 represents the ten channels from the remote stations at the intermediate frequency and these ten intermediate frequency channels are applied in common to the ten receiver demodulators 41a–41j from the output of the IF distributor amplifier 39. Each receiver demodulator will pick out the intermediate frequency channel for a respective remote station and convert that channel to the six sub-channel frequency band of 12–36 KHz. The outputs of the respective receiver demodulators 41a–41j are then applied to the respective sub-group modems 22a–22j for application to the individual channel modems for conversion to voice frequency.

As can be seen from the foregoing description of a preferred embodiment, the present invention provides for a transmitter oscillator modulator and an independent receiver local oscillator in the master station and in each of the remote stations so that separate and completely-independent transmit and receive frequencies $f_t$ and $f_r$ are utilized in the system. This eliminates the need for frequency lock loops, as required in the prior art where the IF frequencies are constrained to be the difference between the transmit and receive frequencies. This also provides more freedom in the selection of the two licensed frequencies for the system and also makes it possible to more completely standardize the equipment used in the various stations.

Further, by allocating six (or twelve) VF channels to each channel of communication between the master and remote stations, the spectral efficiency of the system in accordance with the present invention is greatly improved. This also provides an enhanced ability to selectively mix the types of equipment connected to the system so as to provide a wide variety of services.

While we have shown and described several embodiments in accordance with the present invention, it is understood that the invention is not limited to the details shown and described herein but is susceptible to numerous changes and modifications as known to one of ordinary skill in the art, and we therefore do not wish to be limited to the details shown and described herein but intend to cover all such changes as obvious to those skilled in the art.

What is claimed is:

1. In a system for effecting two-way radio transmission between a master station and a plurality of remote stations, each remote station comprising baseband modulation means for modulating a signal channel to produce a baseband signal at a selected frequency;

a transmitter including first means for modulating said baseband signal on a carrier $f_c$ whose frequency is uniquely assigned to the respective remote station and falls within a transmission band allocated to a first licensed frequency $f_r$ and second means for transmitting said modulated baseband signal to the master station as a channel signal;

a receiver including third means for receiving from said master station a multiplexed multi-channel signal modulated on a second licensed frequency $f_t$ and fourth means for downconverting said received signal to a nominal IF frequency;

demodulation means for demodulating said multi-channel IF frequency signal to a multi-channel baseband signal; and demultiplexing means for locating a channel of information destined for the respective remote station in a specific section of the demodulated multi-channel baseband signal and for converting said channel located in the specific section of the baseband signal to a voice frequency channel;

said first means in said transmitter including a first local oscillator for effecting modulation of said baseband signal, and said fourth means in said receiver including a second local oscillator which is independent of said first local oscillator for downconverting said received signal.

2. A system according to claim 1, wherein the carrier frequencies $f_c$ of the plural remote stations are equally spaced within said transmission band allocated to said first licensed frequency $f_r$, and wherein the first local oscillator in each remote station produces a carrier output $f_c$ which is equal to $f_c = f_r - BW(N+1)/2N + BW \cdot n/N$, where BW is the authorized bandwidth of the channel centered on $f_r$, N is the number of remote stations, and n is the position of the channel for that remote station in the transmission band in the order of increasing frequency.

3. A system according to claim 1, wherein said signal channel modulated by said baseband modulation means includes a plurality of voice frequency channels, said modulation means and said demodulation means comprising a plurality of voice frequency channel modems and multiplexing means for combining the modulated outputs of said channel modems into a baseband signal for application to said transmitter and for separating the extracted channel received from said demodulation means into channels for application to the respective voice frequency channel modems.

4. A system according to claims 1 or 3, wherein said master station comprises means for receiving the plural channel signals from said remote stations; downconverting means including a local oscillator providing an output at such a frequency as to convert the received channel signals to respective intermediate frequency signals; means including a plurality of demodulators for converting the respective intermediate frequency signals to individual channel signals at a selected baseband frequency; and channel modem means for converting said channel baseband signals to outgoing voice frequency channels.

5. A system according to claim 4, wherein said channel modem means in said master station includes a plurality of modems which convert incoming voice frequency channels to channel baseband signals; means for modulating said channel baseband signals on a carrier having said second licensed frequency $f_t$ to produce said multi-channel modulated signal; and means for transmitting said multi-channel modulated signal to said remote stations.

6. A system according to claim 5, wherein said means for modulating said channel baseband signals and said downconverting means in said master station each include a separate local oscillator operating on the respective first licensed frequency $f_t$ and the second licensed frequency $f_r$ plus or minus the nominal IF frequency of said receiving means.

* * * * *